United States Patent
Murakami (10) Patent No.: US 8,750,689 B2
(45) Date of Patent: Jun. 10, 2014

(54) RECORDING APPARATUS

(71) Applicant: Canon Kabushiki Kaisha, Tokyo (JP)

(72) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/674,717

(22) Filed: Nov. 12, 2012

(65) Prior Publication Data

US 2013/0156403 A1 Jun. 20, 2013

(30) Foreign Application Priority Data

Dec. 14, 2011 (JP) .................................. 2011-273506

(51) Int. Cl.
*H04N 5/92* (2006.01)
*H04N 5/93* (2006.01)
*H04N 9/80* (2006.01)
*G06F 12/00* (2006.01)
*G06F 17/30* (2006.01)

(52) U.S. Cl.
USPC ........... 386/326; 386/353; 386/239; 386/248; 707/821; 707/822; 707/823; 707/824; 707/825; 707/829; 707/828

(58) Field of Classification Search
USPC ......... 707/821, 822, 823, 824, 825, 828, 829; 386/326, 353, 239, 248
See application file for complete search history.

(56) References Cited

U.S. PATENT DOCUMENTS 6,078,727 A * 6/2000 Saeki et al. .................... 386/351

FOREIGN PATENT DOCUMENTS

JP 2006-74531 3/2006

OTHER PUBLICATIONS

U.S. Appl. No. 13/674,713, filed Nov. 12, 2012. Inventor: Naoyuki Murakami.

* cited by examiner

*Primary Examiner* — Daquan Zhao
(74) *Attorney, Agent, or Firm* — Fitzpatrick, Cella, Harper & Scinto

(57) ABSTRACT

A recording apparatus having a recording unit for recording a moving image file including a first area to store moving image data and a second area to store meta data into a recording medium generates first position information regarding a position of the moving image data in the first area and second position information which can represent a larger value than the first position information with respect to the position of the moving image data in the first area, stores both of the generated first and second position information into the second area, and records them as a moving image file into the recording medium.

8 Claims, 5 Drawing Sheets

| DATA | SIZE (BYTE) | VALUE |
|---|---|---|
| BOX SIZE | 4 | WHOLE SIZE |
| BOX TYPE | 4 | stco |
| VERSION | 1 | 0 |
| FLAG | 3 | 0 |
| NUMBER OF ENTRIES | 4 | NUMBER OF ENTRIES OF OFFSET |
| OFFSET (n) | 4×N | OFFSET VALUE OF EACH CHUNK |

402

| DATA | SIZE (BYTE) | VALUE |
|---|---|---|
| BOX SIZE | 4 | WHOLE SIZE |
| BOX TYPE | 4 | co64 |
| VERSION | 1 | 0 |
| FLAG | 3 | 0 |
| NUMBER OF ENTRIES | 4 | NUMBER OF ENTRIES OF OFFSET |
| OFFSET (n) | 8×N | OFFSET VALUE OF EACH CHUNK |

FIG. 5

RECORDING APPARATUS

BACKGROUND OF THE INVENTION

1. Field of the Invention

The present invention relates to a recording apparatus and, more particularly, to a recording apparatus for recording data based on a different file system so that the recorded data can be reproduced.

2. Description of the Related Art

Hitherto, an MP4 file format has been known as a file format for recording a moving image signal and an audio signal into a recording medium (refer to the Official Gazette of Japanese Patent Application Laid-Open No. 2006-074531). According to the MP4 format, besides an area for storing the encoded moving image signal and audio signal, an area for storing meta data including position information and the like necessary to reproduce and decode a moving image and an audio sound is provided.

In a file system in the related art such as FAT32 or the like for managing files, a file size is represented with a value of 32 bits. By using the 32-bit value, a file whose file size is up to 4 Gigabytes (GB) can be represented.

In recent years, a file system which can represent the file size with a value of 64 bits has been proposed. Therefore, even in a moving image file such as an MP4 file, it is necessary to expand the file size so that a size exceeding 4 GB, which can be represented with a 64-bit value can be handled.

However, in a reproducing apparatus which can reproduce the moving image file of up to 4 GB in the related art, a moving image file of a size exceeding 4 GB cannot be handled. Therefore, in the case where the moving image file is recorded in a format of the expanded file size, there is such a problem that the recorded moving image file cannot be reproduced by the reproducing apparatus in the related art.

SUMMARY OF THE INVENTION

In view of the above-described problem, it is an aspect of the invention to provide a recording apparatus for recording a moving image file recorded in a format of an expanded file size so that it can be reproduced.

In order to accomplish the above-described object, according to the invention, a recording apparatus comprises: a recording unit configured to record a moving image file including a first area for storing moving image data and a second area for storing meta data into a recording medium; a generating unit configured to generate first position information regarding a position of the moving image data in the first area and second position information which can represent a larger value than the first position information with respect to the position of the moving image data in the first area; and a control unit configured to control the recording unit so as to store both of the first position information and the second position information generated by the generating unit into the second area to record the moving image file into the recording medium.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
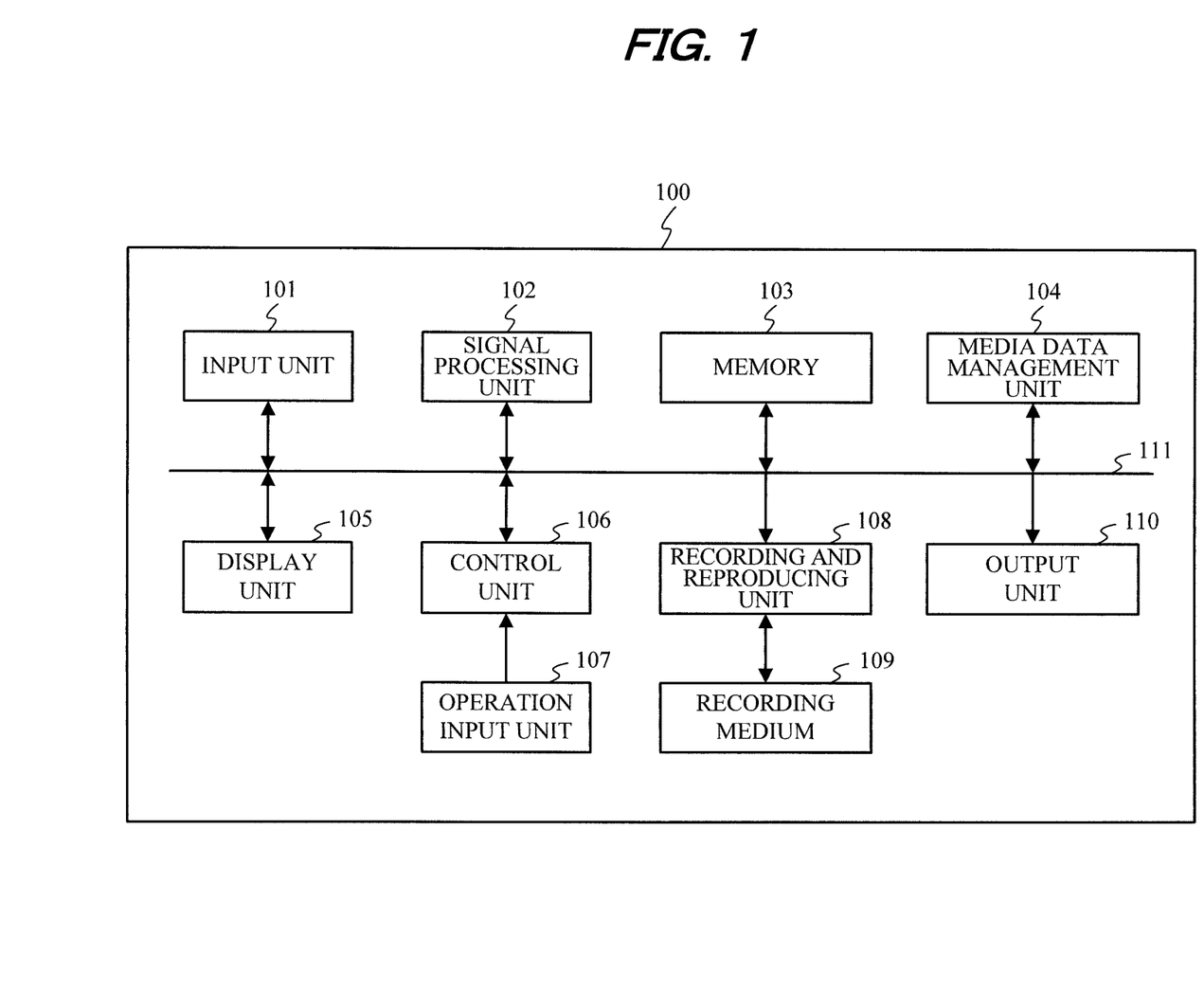
FIG. 1 is a block diagram illustrating an example of a construction of a recording apparatus according to an embodiment of the invention.

FIG. 1 is a block diagram illustrating an example of a construction of a recording apparatus according to an embodiment of the invention.

In FIG. 1, an input unit 101 obtains moving image data and audio data and outputs them. Although the input unit 101 inputs the moving image data and audio data supplied from an outside of a data processing apparatus 100 in the present embodiment, the input unit 101 may be constructed so as to include an image pickup unit and a microphone to obtain the photographed moving image and the audio data collected by the microphone.

Upon recording, a signal processing unit 102 encodes the moving image data and audio data which are input by the input unit 101, in accordance with a well-known encoding format such as H.264 (MPEG4 AVC) or the like to compress an information amount. The signal processing unit 102 also executes a processing necessary for recording the moving image data and audio data. Upon reproduction, the signal processing unit 102 decodes the reproduced moving image data and audio data to expand an information amount thereof. Upon recording, the signal processing unit 102 outputs information of a code amount (data amount) of the encoded moving image data and audio data to a control unit 106.

A memory 103 stores the moving image data and audio data. Each block of the data processing apparatus 100 accesses the memory 103, thereby processing the necessary moving image data and audio data. Besides the moving image data and audio data, the memory 103 stores various kinds of information such as information of a file system, management information of a moving image file, and the like and further plays a role of a work memory or the like for control by the control unit 106.

Upon recording, a media data management unit 104 generates various kinds of information specified by the MP4 file as will be described hereinafter. Upon reproduction, the media data management unit 104 processes the reproduced management information and informs the control unit 106 of its contents. A display unit 105 displays the moving image which is input or the reproduced moving image or various kinds of information such as menu information and the like.

The control unit 106 controls the whole operation of the data processing apparatus 100 in accordance with an input from an operation input unit 107. The control unit 106 includes a microcomputer, a memory, and the like and controls the data processing apparatus 100 in accordance with a program stored in a ROM (not shown). The operation input unit 107 includes various kinds of switches which can be operated by the user. The operation input unit 107 receives various kinds of instructions from the user and notifies the control unit 106 of them. The operation input unit 107 also includes a power switch, switches for instructing start and stop of the recording, a switch for changing over a mode of the data processing apparatus 100, and the like.

A recording and reproducing unit 108 records the moving image data and audio data or various kinds of information into a recording medium 109 and reproduces those data from the recording medium 109. Upon recording, the recording and reproducing unit 108 records the management information and the moving image data or audio data stored in the memory 103 into the recording medium 109. Upon reproduction, the recording and reproducing unit 108 reproduces the management information and the moving image data or audio data of the moving image file from the recording medium 109 and stores them into the memory 103. In the present embodiment, the recording medium 109 is a random-access recording medium such as hard disk (HDD), flash memory card, or the like.

The recording and reproducing unit 108 manages the moving image file and various kinds of information which are recorded into the recording medium 109, as a file in accordance with a file system such as FAT (File Allocation Table) or the like. In the present embodiment, a file system which can represent the file size with 64 bits is used. Therefore, the maximum file size which can be handled by the recording apparatus of the present embodiment is equal to 2**64 (2 to the power of sixty-four) bytes. Although the recording apparatus is constructed in such a manner that the recording medium 109 can be easily loaded and unloaded into/from the data processing apparatus 100 by a loading/unloading mechanism (not shown), the data processing apparatus 100 may be arranged to have a built-in recording medium 109.

In the case of writing and reading out the moving image file into/from the recording medium 109, the control unit 106 controls the recording and reproducing unit 108 so as to reproduce file system data (management data) from the recording medium 109 and store into the memory 103. The file system data is data showing a file name of the data recorded in the recording medium 109, a file size, a recording address of the data, and the like and thus is the management information to manage the file. The control unit 106 controls the writing and read-out of the file in accordance with the read-out file system data. In accordance with the file being written into the recording medium 109, the control unit 106 updates the file system data stored in the memory 103 and records the updated file system data into the recording medium 109 by the recording and reproducing unit 108.

An output unit 110 outputs the reproduced moving image data and audio data to an external apparatus.

Figure 2:
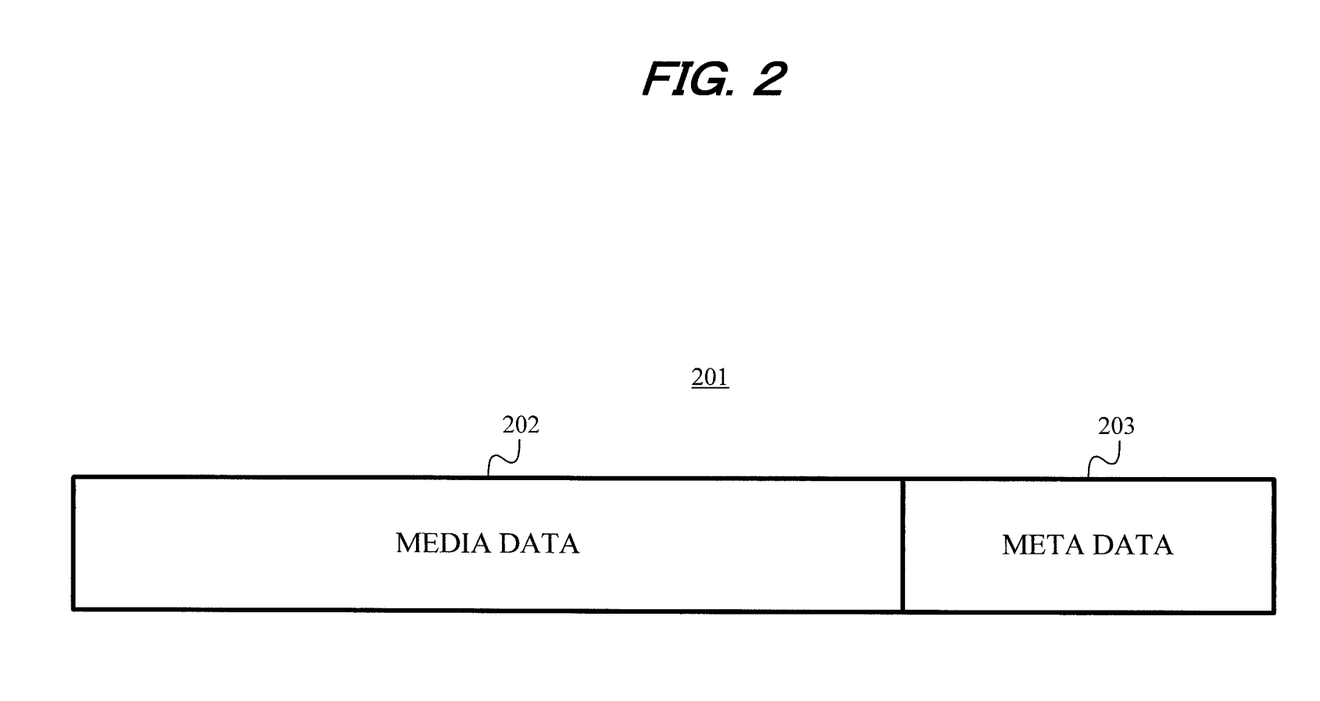
FIG. 2 is a diagram illustrating an example of a file format which is handled in the embodiment of the invention.

Subsequently, an information file which is handled in the present embodiment will be described. FIG. 2 illustrates a construction of a moving image file 201 which is handled in the present embodiment.

The moving image file 201 includes a first area 202 for storing information data such as moving image data, audio data, and the like. The moving image file 201 also includes a second area 203 into which meta data including position information regarding the positions of the moving image data and audio data stored in the first area 202 is stored. A size of the moving image data, audio data and the meta data stored in the respective areas increases in accordance with recording time. Each information which is stored in the meta data is information regarding the moving image data and audio data. Therefore, after the moving image data and audio data are recorded, contents of each information are determined. As a format for recording the moving image data in such a file format, an MP4 file format has been known. In the present embodiment, the moving image file is recorded in accordance with the MP4 file format. In the MP4 file, the first area corresponds to an mdat box and the second area corresponds to an moon area.

The MP4 file is constructed by a unit called "box". One box includes areas of box-size, box-type, and box-data. Information of a data length (size) of this box is stored into box-size. Information showing a type of data which is stored into box-data is stored into box-type. Real data is stored into box-data. The box-type is a 32-bit data area of a fixed length. The box-data is an area of a variable length. Since the box-size is generally equal to 32 bits, a size of one box is generally equal to or less than 0xFFFFFFFF bytes. Therefore, as will be described hereinafter, when a size of moving image stored in the mdat box exceeds 4 GB, the box-size in the mdat box is recorded as 64-bit data.

Figure 3:
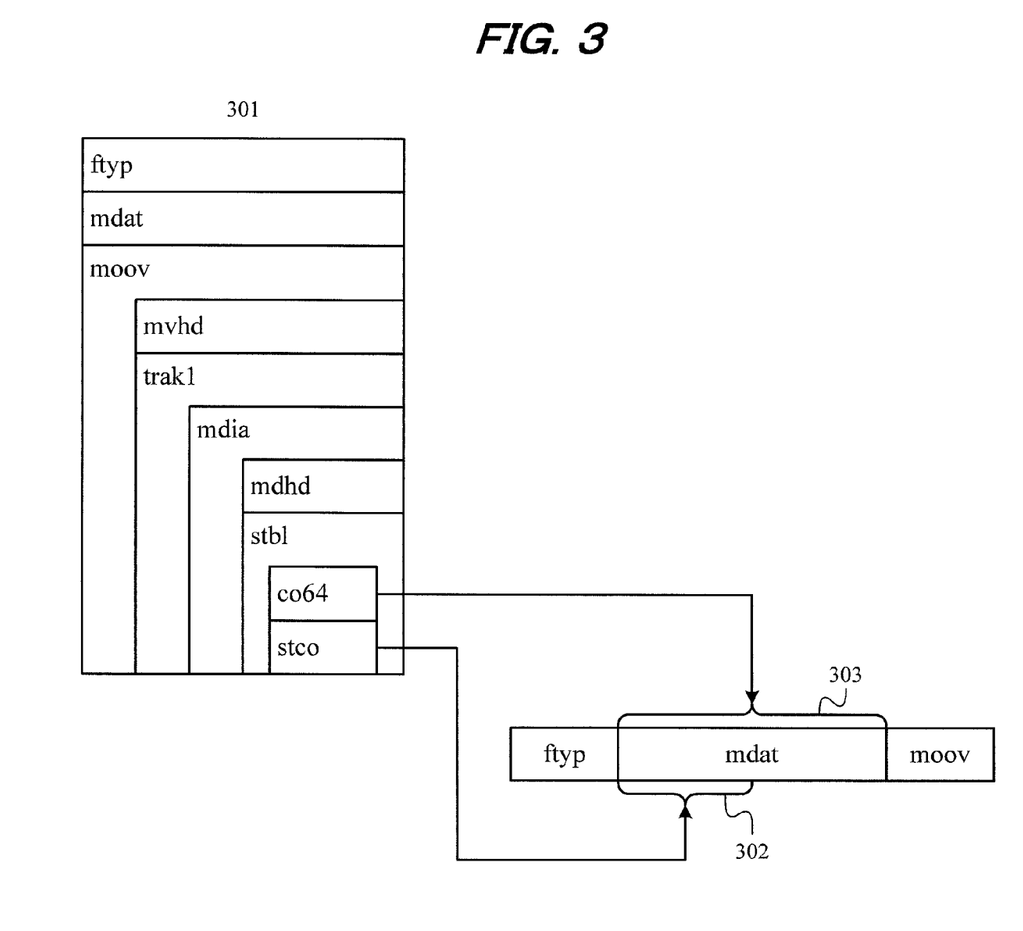
FIG. 3 is a diagram illustrating a construction of an MP4 file.

FIG. 3 illustrates an example of a construction of a moving image file 301 of the MP4 file format which is handled in the embodiment. The moving image file 301 is constructed by three boxes of FileTypeBox(ftyp), MediaDataBox(mdat), and MovieBox(moov). Each box of ftyp, mdat, and moov is a highest layer.

The ftyp is a box in which the box-type is ftyp and information regarding file compatibility is stored. On the basis of box-data described in the ftyp, an encoding system or the like of the moving image data and audio data stored in the MP4 file can be discriminated.

The mdat is a box in which the box-type is mdat and each sample of the moving image data and audio data is stored. Each of the encoded moving image data and audio data is divided into units of "chunk" to be stored. In the present embodiment, it is assumed that one chunk of the moving image data is the moving image data of 1GOP specified by the H.264 system. It is also assumed that one chunk of the audio data is the audio data of the number of frames corresponding to 1GOP.

The moov is a box in which the box-type is moov and the meta data regarding the moving image data and audio data is stored. Information such as chunk offset showing an offset from a file head of each chunk of the moving image data and audio data, the number of samples of each chunk, sample size, and the like is stored in box-data of moov. The moov includes mvhd and one or more trak. A trak box is information which defines one or more video tracks and video/audio tracks. The trak includes tkhd and mdia. The mdia is information describing a media type and the like of each track. The mdia includes mdhd and stbl. Information such as chunk offset showing an offset from the file head of each chunk of the moving image data and audio data, the number of samples of each chunk, display time of the sample, sample size, and the like is stored in the stbl. One sample of the moving image data corresponds to a frame and one sample of the audio data corresponds to an audio frame. Each of stco and co64 is information showing a position (offset position) from the file head of each chunk of the moving image data and audio data stored in the mdat. Those position information is information necessary to reproduce the moving image data and audio data stored in the moving image file. The co64 is a box in which the position information which can represent the position information of 64 bits can be stored.

Figure 4:
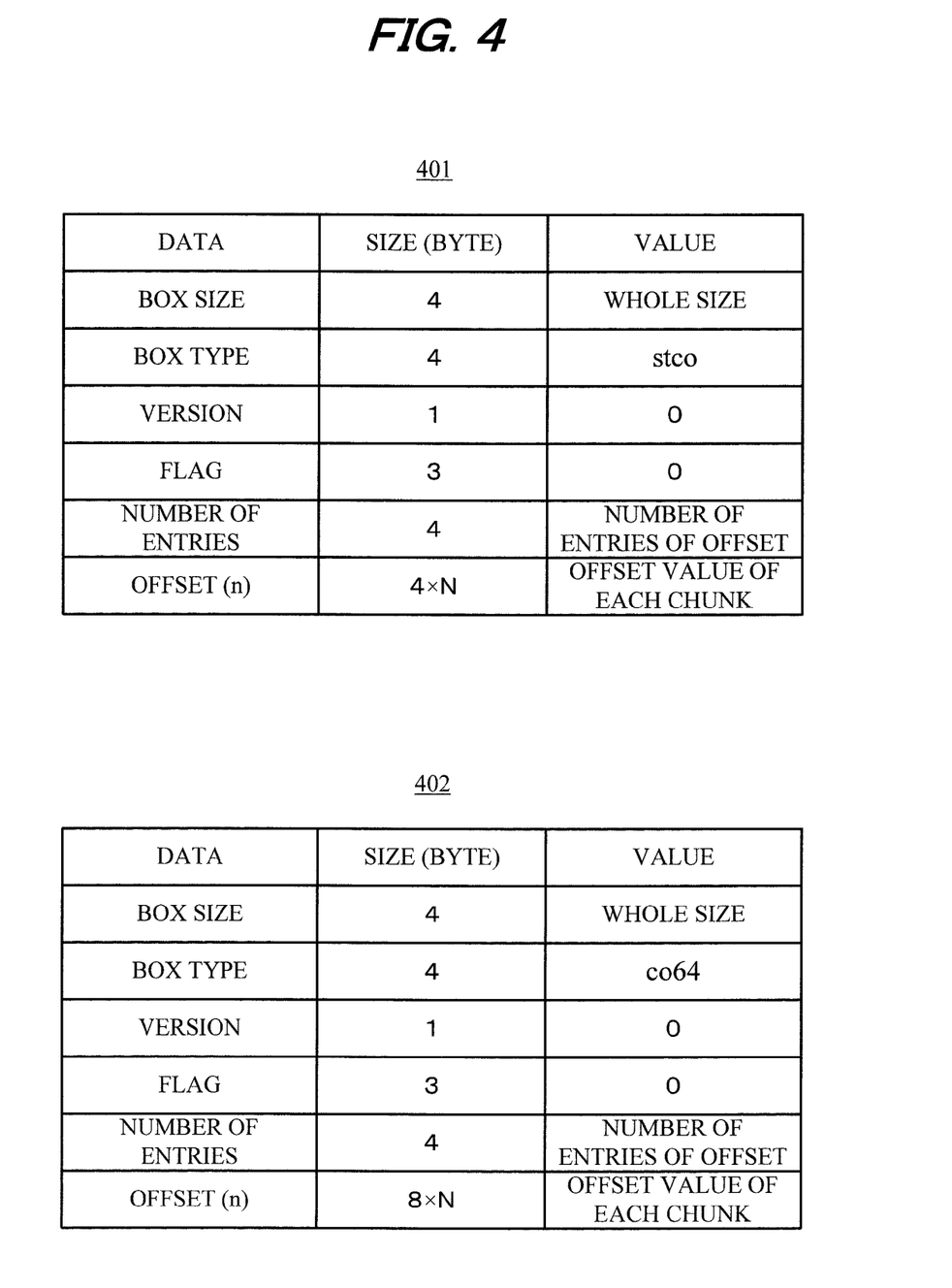
FIG. 4 is a diagram illustrating a construction of position information in an MP4 file format.

Data which is stored in each of the stco box and the co64 box is shown in FIG. 4. Reference numeral 401 denotes a stco box. A box size indicates a size of the whole box. The stco is stored as a box type. A version indicates a version of the box and "0" is ordinarily stored there. Although a flag is used in another box type, since it is not used here, "0" is stored there. The number of entries indicates the number of next elements "offsets". A value showing the position from the file head of each chunk of the moving image data and audio data which are stored in the mdat is stored in an offset. One entry indicates an offset of one chunk. In the case of reproducing, by referring to the offset, the position in the file where the moving image data as a reproduction target exists can be known. The offset which is stored in the stco box is data of 4 bytes (32 bits). Therefore, in the stco, if the size of moving image file is up to 4 GB, the offset value of each chunk can be shown.

Reference numeral 402 denotes a co64 box. The co64 box 402 is substantially the same as the stco except for the last offset. The offset which is stored in the co64 box is data of 8 bytes (64 bits). Therefore, in the co64 box, a value larger than that of the stco box can be represented as an offset value of each chunk. Thus, in the co64, even if the size of moving image file exceeds 4 GB, the offset value of each chunk can be represented.

Reference numeral 302 in FIG. 3 denotes a range of the data stored in the mdat box in which the position information which is stored in the stco can represent. Similarly, reference numeral 303 in FIG. 3 denotes a range of the data stored in the mdat box in which the position information which is stored in co64 can represent.

Figure 5:
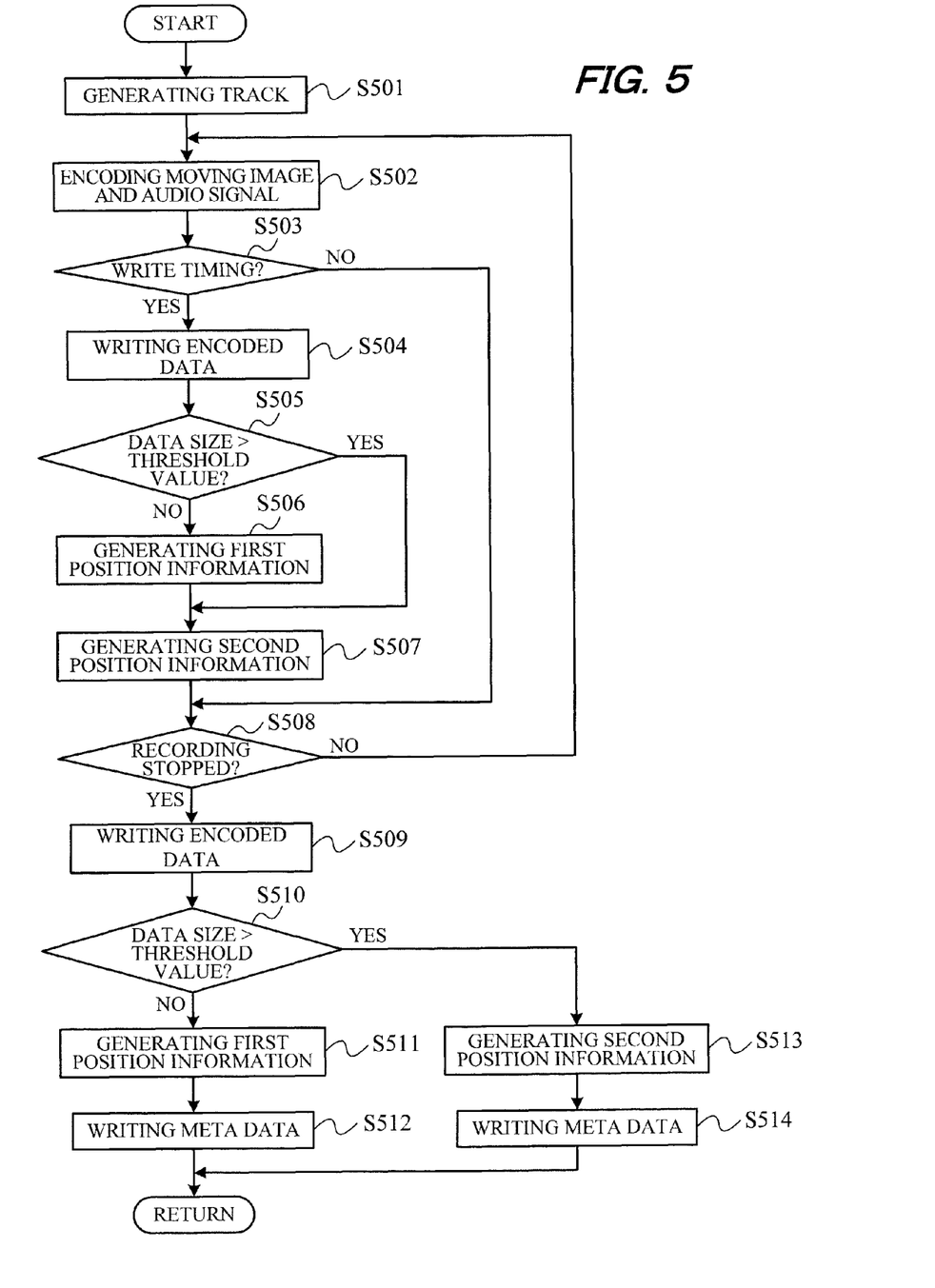
FIG. 5 is a diagram illustrating a flowchart for a recording processing according to the first embodiment of the invention.

Subsequently, a recording processing of a moving image will be described. FIG. 5 is a diagram illustrating a flowchart for the recording processing according to the embodiment. Processings of FIG. 5 are executed in such a manner that the control unit 106 controls each unit in accordance with the program stored in the ROM (not shown).

In the present embodiment, until the size of moving image file exceeds 4 GB, both of the two information of the position information which is stored in the co64 box and the position information which is stored in the stco box are generated and stored. When the size of moving image file exceeds 4 GB, between those two information, the position information which is stored in the co64 box is generated and the generation of the position information which is stored in the stco box is stopped. After the recording stop is instructed, the position information generated as mentioned above is respectively stored into the stco box and the co64 box in the trak1 box in accordance with the size of the recorded moving image file and is recorded as a moving image file into the recording medium. Specifically speaking, if the size of the recorded moving image file does not exceed 4 GB, the first position information is recorded and the second position information is not recorded. If the size of the recorded moving image file exceeds 4 GB, both of the first position information and the second position information are recorded into the recording medium 109.

In a recording standby state, when a recording start instruction is received from the operation input unit 107, the control unit 106 newly generates a moving image file. A track (as illustrated in FIG. 3, trak box having the co64 box and the stco box) is generated (S501). The encoding of the moving image and audio is started (S502). The encoded moving image data and audio data are sequentially stored into the memory 103. In association with the encoding processing of the moving image and audio, the control unit 106 stores the information such as a generated code amount and the like provided from the signal processing unit 102 into the memory 103. In this manner, the encoded moving image data and audio data which are not recorded yet are sequentially stored into the memory 103. When the code amount of each of the unrecorded moving image data and audio data stored in the memory 103 reaches a predetermined value, the control unit 106 determines that timing for writing into the recording medium 109 has come (S503). The control unit 106 instructs the recording and reproducing unit 108 to record the moving image data and audio data stored in the memory 103 (S504). In response to such an instruction, the recording and reproducing unit 108 sequentially stores the moving image data and audio data into the mdat box in FIG. 3 and records them as a moving image file into the recording medium 109.

When the writing of the moving image data and audio data to be written is completed in the writing processing of one time, the control unit 106 discriminates whether or not the size of moving image file which is being recorded at present has, exceeded a preset threshold value (S505). In the present embodiment, the threshold value is assumed to be 4 GB. Specifically speaking, the control unit 106 discriminates whether or not the sum of the moving image data and audio data which are stored into the mdat box and the meta data which is stored into the moon box exceeds 4 GB. This is because the maximum value which can be represented by 32 bits is a value equal to two to 32-th power (2**32). A similar recording processing can be also executed by setting another value smaller than 4 GB as a threshold value.

When the file size does not reach the threshold value, the control unit 106 instructs the media data management unit 104 to generate the position information (first position information) which represents the position of each chunk of the data which is recorded just before, with the 32-bit data (S506). This first position information is recorded as offset data in the stco box. Further, the control unit 106 instructs the media data management unit 104 to generate the position information (second position information) which represents the position of each chunk of the data which has been recorded just before, with the 64-bit data (S507). This second position information is recorded as offset data in the co64 box (S514). The media data management unit 104 detects the position (the number of bytes) from the file head of each chunk on the basis of the information such as a generated code amount and the like stored in the memory 103. On the basis of the detected position information, the first position information and the second position information are generated and stored in the memory 103.

If the file size exceeds the threshold value as a result of the discrimination in S505, the positions of the moving image data and audio data cannot be represented with 32 bits. Therefore, if the file size exceeds the threshold value, the control unit 106 does not generate the first position information but advances to S507 to instruct the media data management unit 104 to generate the second position information. In the embodiment, since the size of meta data including those position information is relatively small, this data is temporarily stored into the memory 103. After a recording stop instruction is received, the control unit 106 records the stored data in a lump.

The control unit 106 discriminates whether or not there is a recording stop instruction from the operation input unit 107 (S508). If there is not a recording stop instruction, the recording is continued as it is. That is, the processings in S502 to S508 are repeated. On the other hand, if there is a recording stop instruction, the control unit 106 stops the encoding of the moving image and audio, which is executed by the signal processing unit 102. The control unit 106 instructs the recording and reproducing unit 108 to write the unrecorded moving image data and audio data stored in the memory 103 (S509). Subsequently, the control unit 106 discriminates whether or not the size of moving image which is being recorded at present exceeds the predetermined threshold value (S510). If the file size does not reach the threshold value, the control unit 106 instructs the media data management unit 104 to generate the first position information showing the position of each chunk of the data which has been recorded just before (S511).

The media data management unit 104 also generates each meta data defined by the MP4 file format. The control unit 106 instructs the recording and reproducing unit 108 to store the meta data into the moov box to be recorded (S512). At this time, since the file size does not exceed the threshold value, the control unit 106 does not record the second position information but instructs the recording and reproducing unit 108 to record the first position information.

If the file size exceeds the threshold value in S510, the control unit 106 does not generate the second position information but advances to S513 to instruct the media data management unit 104 to generate the second position information (S513).

The media data management unit 104 also generates each meta data defined by the MP4 file format. The control unit 106 instructs the recording and reproducing unit 108 to store the meta data into the moov box to be recorded (S514). At this time, since the file size exceeds the threshold value, the control unit 106 instructs the recording and reproducing unit 108 to record both of the first position information and the second position information.

As mentioned above, in the embodiment, until the size of moving image file reaches the threshold value after the recording is started, both of the first position information and the second position information are generated. After the file size reached the threshold value, the second position information is generated and those position information is stored into the moon box to be recorded. At this time, in the present embodiment, as illustrated in FIG. 3, the second position information (co64) is first recorded and, subsequently, the first position information (stco) is recorded.

Subsequently, the operation at the time of reproducing the moving image file recorded as mentioned above will be described. When there is a reproducing instruction of the moving image file from the operation input unit 107, the control unit 106 instructs each unit to read out the designated moving image file to reproduce it. The recording and reproducing unit 108 reads out the designated moving image file from the recording medium 109 to store into the memory 103. At this time, since the sizes of the moving image data and audio data are very large, all of them cannot be stored into the memory 103 in a lump. Therefore, the recording and reproducing unit 108 sequentially reads out the necessary portions from the recording medium 109 to store into the memory 103. In order to sequentially read out the necessary portions, it is necessary to know the positions in the file where desired moving image data and audio data exist, by using the position information stored in the stco box and the co64 box.

For this purpose, the control unit 106 first designates the data in the moov box and instructs the recording and reproducing unit 108 to read out it. The recording and reproducing unit 108 reads out the data in the moov box from the recording medium 109 to store into the memory 103. The media data management unit 104 analyzes the moov stored in the memory 103 and detects the positions so that it can access each internal box. In order to know the positions of the moving image data and audio data to be subsequently read out, the media data management unit 104 obtains the information in the stco box or the co64 box. Ordinarily, the data is subsequently analyzed from the head of the file. Therefore, in the moving image file in FIG. 3, the co64 box in the trak1 in the moov is referred to first.

On the basis of the position information in the co64 box, the position of each chunk of the moving image and audio in the mdat is detected. On the basis of the position of each chunk, the control unit 106 designates the data of the necessary chunk and instructs the recording and reproducing unit 108 to read out it. The recording and reproducing unit 108 reads out the data at the designated position to store into the memory 103. The moving image data and audio data stored in the memory 103 are subsequently decoded by the signal processing unit 102.

A case where the moving image file recorded as mentioned above is reproduced by an apparatus which cannot reproduce the moving image file of the file size exceeding 4GB will now be described. In such a reproducing apparatus, since the co64 box is a box which cannot be recognized, it is ignored upon reproduction. The next stco box is referred to, and with respect to the portions of 4 GB or less, the positions of the moving image data and audio data are detected to be reproduced. By arranging the co64 box to a position on the head side of the file than the stco box, in the case where the reproducing apparatus cannot recognize the co64 box, the stco is referred to, while in the case where the reproducing apparatus can recognize the co64 box, the co64 box is referred to instead of the stco box.

As mentioned above, in the present embodiment, when the size of the moving image file exceeds 4 GB, both of the stco box and the co64 box are recorded. Therefore, even the reproducing apparatus which cannot recognize the co64 box can normally reproduce the moving image file by referring to the stco box, with respect to the portions of up to 4 GB.

Therefore, according to the recording apparatus of the invention, when the moving image is recorded in the file format expanded so as to cope with the file system which represents the file size with 64 bits, even the apparatus which copes with only 32 bits, can reproduce a part of such a file.

Although the moving image and audio are recorded in the MP4 file format in the embodiment, they can be also recorded in another file format such as QuickTime (registered trademark).

Other Examples

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-273506 filed on Dec. 14, 2011, which is hereby incorporated by reference herein in its entirety.

What is claimed is:

1. A recording apparatus comprising:
   a recording unit configured to record a moving image file including a first area for storing moving image data and a second area for storing meta data including one or more tracks into a recording medium;
   a generating unit configured to generate first position information representing a position of the moving image data in the first area and second position information which can represent a larger value than the first position information with respect to the position of the moving image data in the first area; and a control unit configured to generate a first track and control the recording unit so as to store the first track into the second area and to record the moving image file into the recording medium, wherein, if a size of the moving image file recorded in the recording medium exceeds a predetermined threshold value, the control unit stores both of the first position information and the second position information into the first track, and if the size of the moving image file recorded in the recording medium does not reach the predetermined threshold value, the control unit stores the first position information into the first track of the moving image file and does not store the second position information into the first track of the moving image file.

2. An apparatus according to claim 1, wherein the generating unit generates both of the first position information and the second position information in accordance with recording of the moving image file being started, and the control unit controls the generating unit in such a manner that when the size of the moving image file which is being recorded exceeds the predetermined threshold value, the generation of the first position information is stopped and the second position information is generated.

3. An apparatus according to claim 1, wherein the moving image data stored in the first area is constructed with a plurality of units and each of the first position information and the second position information represents the positions of a plurality of units included in the moving image data.

4. An apparatus according to claim 1, wherein the recording unit stores the second position information into a position nearer a head of the moving image file than the first position information.

5. An apparatus according to claim 1, further comprising an instructing unit configured to instruct start and stop of the recording of the moving image file into the recording medium, and wherein the control unit discriminates whether or not the size of the moving image file exceeds the threshold value in accordance with the instruction of the recording stop.

6. An apparatus according to claim 1, wherein the predetermined threshold value is set on the basis of a maximum value of values which the first position information can represent.

7. A control method of a recording apparatus having a recording unit configured to record a moving image file including a first area for storing moving image data and a second area for storing meta data including one or more tracks into a recording medium, comprising:

a generating step of generating first position information representing a position of the moving image data in the first area and second position information which can represent a larger value than the first position information with respect to the position of the moving image data in the first area; and a control step of generating a first track and controlling the recording unit so as to store the first track into the second area and to record the moving image file into the recording medium, wherein, if a size of the moving image file recorded in the recording medium exceeds a predetermined threshold value, the control step stores both of the first position information and the second position information into the first track, and if the size of the moving image file recorded in the recording medium does not reach the predetermined threshold value, the control step stores the first position information into the first track of the moving image file and does not store the second position information into the first track of the moving image file.

8. A non-transitory computer-readable storage medium storing a program comprising codes for causing a computer to execute the control method according to claim 7.

* * * * *